United States Patent [19]

Abel

[11] Patent Number: 4,595,132
[45] Date of Patent: * Jun. 17, 1986

[54] DEVICE FOR FRACTURING GLASS ALONG A SCORELINE

[75] Inventor: Donald Abel, Morton, Ill.

[73] Assignee: Morton Glass Works, Morton, Ill.

[*] Notice: The portion of the term of this patent subsequent to Jan. 31, 2001 has been disclaimed.

[21] Appl. No.: 547,581

[22] Filed: Nov. 1, 1983

[51] Int. Cl.$^4$ .............................................. C03B 33/04
[52] U.S. Cl. .................................. 225/103; 225/96.5; 269/303
[58] Field of Search ..................... 225/93, 96.5, 103; 269/303, 315, 900

[56] References Cited

U.S. PATENT DOCUMENTS

| | | | |
|---|---|---|---|
| 1,357,474 | 11/1920 | Remsberg. | |
| 1,954,708 | 4/1934 | Mass. | |
| 2,061,569 | 11/1936 | Fischer. | |
| 2,273,716 | 2/1942 | Louviaux et al. | |
| 2,814,163 | 3/1952 | Krulwich. | |
| 3,592,370 | 7/1971 | Boardman | 225/2 |
| 3,903,767 | 9/1975 | Kupersmith | 83/7 |
| 4,005,808 | 2/1977 | Insolio | 225/2 |
| 4,009,813 | 3/1977 | Insolio et al. | 225/103 |
| 4,120,220 | 10/1978 | Mullen | 83/886 |
| 4,247,031 | 1/1981 | Pote et al. | 225/96.5 |

Primary Examiner—Frank T. Yost
Assistant Examiner—Hien H. Phan
Attorney, Agent, or Firm—Bacon & Thomas

[57] ABSTRACT

A device for fracturing glass along a scoreline is disclosed which is particularly useful for forming glass pieces of irregular shapes, such as those utilized in stained glass artworks. The device has a convexly curved fulcrum element attached to one leg of a "U"-shaped manipulating member, while a pressure block, having a concavely curved planar surface facing the fulcrum element, is attached to an adjacent leg of the manipulating member. A force exerted by the pressure block and the fulcrum element on a scored glass piece located between them causes the glass to fracture along the scoreline. The device also has a glass support surface which supports the glass while being fractured, and collects and retains the minute glass chips generated by the fracturing process.

7 Claims, 5 Drawing Figures

U.S. Patent     Jun. 17, 1986     4,595,132
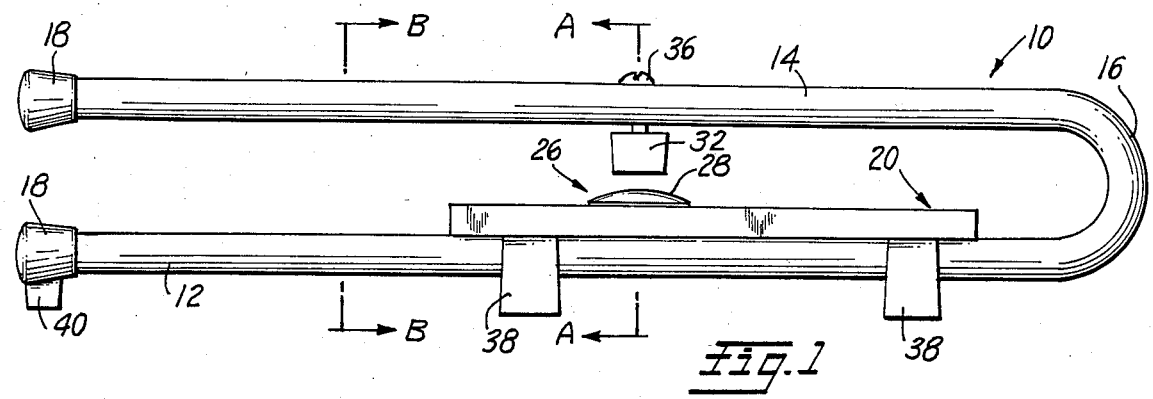
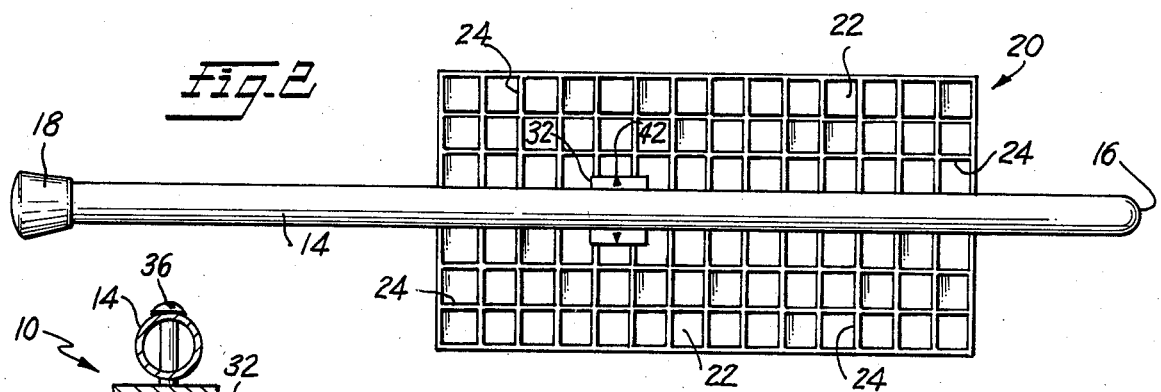
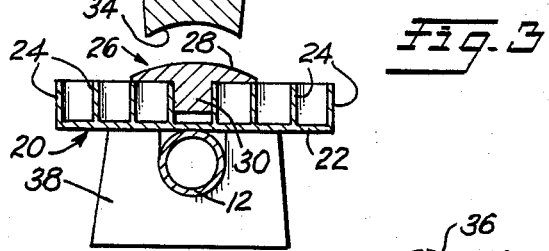
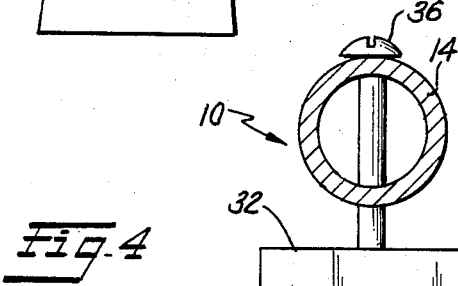
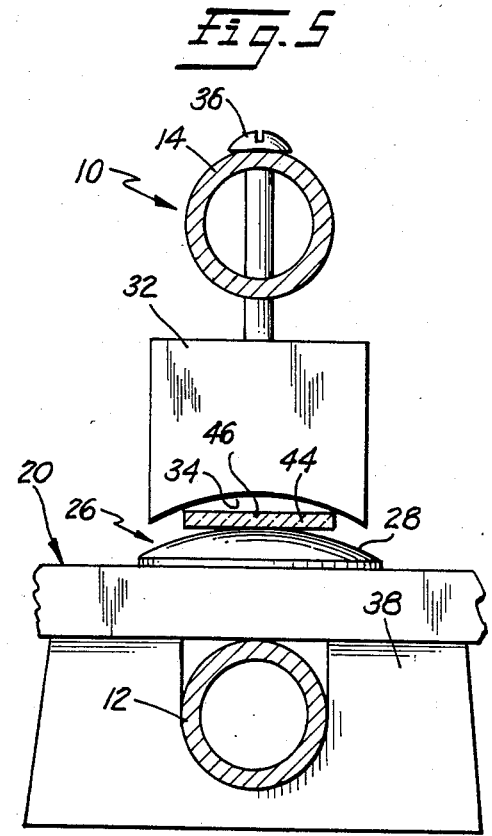
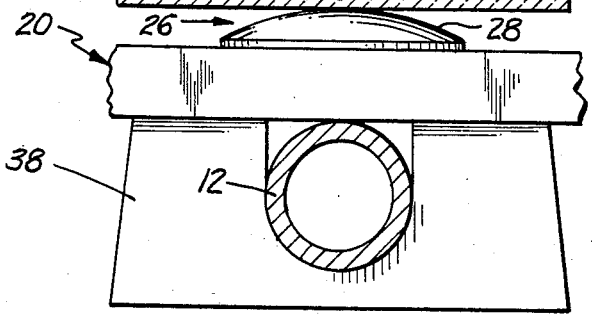

DEVICE FOR FRACTURING GLASS ALONG A SCORELINE

FIELD OF THE INVENTION

This invention relates to the devices for fracturing glass along a scoreline, particularly those tools that are manually operable and utilized to cut glass into various shapes as required in creating stained glass artworks.

RELATED APPLICATIONS

This application is related to U.S. Ser. No. 312,181 filed on Oct. 16, 1981 now U.S. Pat. No. 4,428,518 by the instant inventor directed toward a "Glass Breaking Tool" which is a continuation-in-part of Ser. No. 201,719 filed on Oct. 29, 1980 and now abandoned. This application also relates to U.S. Ser. No. 318,450 filed Nov. 5, 1981 and now U.S. Pat. No. 4,497,477 by the instant inventor directed toward "Apparatus for Cutting Glass into Various Shapes" which is a continuation-in-part of Ser. No. 201,718 filed on Oct. 29, 1980, now abandoned.

BRIEF DESCRIPTION OF THE PRIOR ART

The concept of cutting glass by first scoring it along a surface, placing it over a fulcrum element and subsequently applying a downward force on either side of the scoreline causing the glass to fracture along the scoreline is well-known in the art, and over the years many devices have been developed to facilitate this basic process. When the size of the glass being cut is relatively large and is being cut in straight lines, the operator need only place an elongated fulcrum edge below the glass opposite the scoreline and exert a downward force on either side of the scoreline to cause the glass to fracture. The fulcrum device typically comprises an elongated member having either a circular or a triangular cross section and is placed directly below the scoreline. Various machinery has been developed over the years which fully automates this process and assures accurate cutting of relatively large pieces of glass.

While these devices are fully satisfactory for commercial installations where large pieces of glass must be cut accurately and rapidly, they are totally inadequate for use by the hobbyist who creates stained glass artworks. This field of endeavor often requires cutting very narrow, elongated glass strips, and glass pieces having curved, irregular shapes. The cutting of narrow, elongated strips of glass does not create a problem in using the elongated fulcrum edges of the prior art devices, but due to the insufficient glass material on either side of the scoreline it is extremely difficult for the user to apply sufficient force to break the glass along the scoreline.

Cutting the glass into irregular, curved shapes also creates its own set of problems, since the fulcrum edges of the prior art do not coincide with the curved scoreline. Thus, attempts at using the prior art fulcrum edges usually result in the glass breaking in directions other than along the scoreline, resulting in ruined products and wasted material.

Hand-held devices have also been developed to enable the user to readily break the glass along the scoreline. These generally comprise a plier-like device wherein a central raised portion is incorporated into the lower jaw while the upper jaw has laterally displaced protrusions. Thus, when the jaws are closed, the lower raised portion acts as the fulcrum point, while the laterally displaced protrusions exert the breaking force. While these devices have been generally successful, they are of no value when it comes to breaking very narrow, elongated pieces of glass or when cutting irregularly shaped curved pieces. The very narrow strips are not wide enough to extend across the jaws so as to contact both lateral protrusions and, thus, it becomes impossible to exert the requisite fracturing force. These devices also do not enable the user to fracture glass along an irregularly curved scoreline, since the reach of the device is limited due to the depth of the jaws. Thus, in many cases, it is simply physically impossible to place the fulcrum and pressure points near the desired scoreline.

SUMMARY OF THE INVENTION

The instant invention obviates the above difficulties of the prior art devices and enables the user to successfully break a very narrow, elongated piece of glass along a scoreline, and to successfully break glass along an irregularly shaped curved scoreline.

The tool according to the invention comprises a generally "U" shaped member having a glass support surface attached to one of the legs and a pressure block attached to the opposite leg. A fulcrum element is attached to the glass support surface adjacent the pressure block, the fulcrum element having an upper surface which is convexly curved in all directions from a central axis. The lower surface of the pressure block, i.e., that surface facing the fulcrum element, is a concavely curved planar surface. The legs of the "U" shaped member are capable of being moved toward and away from each other to consequently move the pressure block toward and away from the fulcrum element.

In order to utilize the device, the glass piece having a scoreline thereon is placed between the fulcrum element and the pressure block such that the fulcrum element is located below the scoreline. Due to the curved surface of the fulcrum element, it makes point contact with the glass on the side opposite the scoreline. The pressure block is oriented such that the lines of contact with the glass are on either side of the scoreline. Manual pressure exerted on the legs of the "U" shaped member forces the pressure block toward the fulcrum element to apply the breaking force to the glass, causing the glass to fracture along the scoreline.

Due to the curved planar surface of the pressure block, the tool may effectively break any width of glass and will provide sufficient force to cause even a very narrow width glass to fracture along a scoreline extending along its length.

When cutting extremely long pieces of glass, or when cutting glass into very irregularly curved pieces, the glass may be manipulated to move the fulcrum element to various places along the scoreline. If the glass is extremely long in relation to its width, it may be placed such that the fulcrum element is at one end and the pressure block brought into play to cause the starting of the fracture along the scoreline. The glass may be then moved to a different location such that the fulcrum element and the pressure block are moved along the scoreline. This process is repeated until the entire length of glass is satisfactorily broken. A similar procedure may be utilized to form irregularly shaped, curved pieces of glass.

Thus, by utilizing a fulcrum point, rather than a fulcrum edge, and a curved surface pressure tool to exert the fracturing force, both of which are attached to a common member, the device can be utilized to fracture pieces of glass along any scoreline.

BRIEF DESCRIPTION OF THE DRAWINGS

FIG. 1 is a side view of the glass fracturing device according to the invention.

FIG. 2 is a top plan view of the glass breaking device shown in FIG. 1.

FIG. 3 is a sectional view of the glass fracturing device according to the invention taken along lines A—A in FIG. 1.

FIG. 4 is a partial sectional view of the glass fracturing device according to the invention taken along lines B—B in FIG. 1 showing the device utilized with a relatively wide piece of glass.

FIG. 5 is a partial sectional view of the glass fracturing device according to the invention taken along lines B—B in FIG. 1 showing the device utilized with a relatively narrow piece of glass.

DETAILED DESCRIPTION OF THE PREFERRED EMBODIMENT

The glass fracturing device according to the invention comprises a generally "U" shaped member 10 having generally parallel legs 12 and 14 joined at one end by curved portion 16. Curved portion 16 is sufficiently resilient to allow the distal ends of legs 12 and 14 to be moved toward each other when acted upon by a manually imposed force. Curved portion 16 is also sufficiently resilient to return the legs 12 and 14 to their generally parallel orientation when the manually imposed force is removed. Although the "U" shaped member 10 is shown as being formed from a single piece of material, quite obviously the legs 12 and 14 may be formed separately and joined together by a hinge or other analogous structure. Member 10 may be formed of any material, such as metal, plastic, etc. without exceeding the scope of this invention. The distal ends of legs 12 and 14 may have end caps 18 thereon to protect the user. End caps 18 may be formed of metal, plastic, or other materials.

Glass support surface 20 is attached to leg 12 such that the glass supporting surface faces leg 14. As seen in FIG. 3, glass support surface 20 comprises a bottom 22 of generally planar configuration having a plurality of walls 24 extending upwardly therefrom. The walls 24 define a plurality of openings which face leg 14. The upper ends of walls 24 define a generally planar support surface upon which the glass may be placed, while the plurality of openings serve to catch and retain the glass chips which are generated during the scoring and/or fracturing process. The chips are retained within the openings below the upper level of the walls 24 and are prevented from being inadvertently touched by the operator. The chips may be easily removed by merely inverting the device.

Fulcrum element 26 comprises an upper portion having a surface 28 which is convexly curved in all directions from a central axis and a locating element 30 which extends downwardly from the upper portion into one of the openings defined by the glass support surface. The surface 28 may be formed as a portion of a sphere, if desired.

Pressure block 32 is attached to leg 14 such that it is located adjacent the upper surface of fulcrum element 26. Pressure block 32 may take any general configuration, but the lower surface 34 facing the fulcrum element is a concavely curved planar surface. Pressure block 32 may be attached to leg 14 via pivot means 36 to enable the orientation of the planar surface to be adjusted by the operator.

Support means 38 may be attached to leg 12 to support the device on a table top, workbench, or similar flat surface. Bumper 40, located on end cap 18 attached to leg 12, prevents the device from tipping over when a downward force is applied to upper leg 14.

In order to utilize the device, the glass piece is first scored in the desired pattern by using a standard glass scoring tool in a known manner. Once the glass has been scored, it is placed between the fulcrum element and the pressure block such that the fulcrum element surface 28 makes point contact with it directly below the scoreline. Pressure block 32 may have indicia 42 located on its upper surface to properly align the pressure block with the scoreline on the glass. As shown in FIGS. 4 and 5, the curved planar surface of the pressure block should be oriented such that the block contacts the glass 44 on either side of the scoreline 46. A manual force exerted on the distal ends of legs 12 and 14 urging them toward each other will force the pressure block toward the fulcrum element and cause the glass to fracture along scoreline 46.

The device is capable of being utilized to effectively fracture glass of any width, even if such width is less than the width of pressure block 32. As shown in FIG. 5, glass 44 is placed over the fulcrum element as before and the pressure block oriented to contact the glass on either side of scoreline 46. Due to the curved, planar shape of the surface, a force urging it toward the fulcrum element will still apply a subsequent force to the glass along either side of the scoreline, thereby causing it to fracture.

The device according to the invention may be utilized by gripping the distal ends of legs 12 and 14 in one hand, in the manner of a pair of pliers, while utilizing the other hand to manipulate the glass. The device also may be placed on a table top and upper leg 14 manipulated by one hand while the other hand holds and manipulates the glass piece.

The foregoing description of the preferred embodiment is for illustrative purposes only and is not to be construed as in any way limiting the invention, the scope of which is defined solely by the appended claims.

I claim:

1. A device for fracturing glass along a scoreline comprising:
   (a) a generally "U" shaped member having the legs of the "U" extending generally parallel to each other, the distal ends of the legs capable of being moved toward and away from each other;
   (b) a glass support surface means attached to a first leg of the "U" shaped member such that it faces a second leg of the "U" shaped member;
   (c) a fulcrum element attached to the support surface means and having a surface which is convexly curved in all directions from a central axis such that it makes point contact with the glass opposite the scoreline; and,
   (d) a pressure block attached to the second leg of the "U" shaped member so as to be located opposite the fulcrum element, the pressure block having a surface facing the fulcrum element which is concavely curved about a single axis oriented generally perpendicular to the central axis wherein the pressure block contacts the glass on opposite sides of the scoreline such that a force exerted on the legs of the "U" shaped member forces the pressure block toward the fulcrum element thereby causing the glass to fracture at the scoreline.

2. The device of claim 1 further comprising means to pivotally attach the pressure block to the second leg of the "U" shaped member.

3. The device of claim 1 wherein the glass support surface means comprises: a bottom member and walls extending therefrom defining a plurality of openings facing the second leg of the "U" shaped member.

4. The device of claim 3 further comprising locating means on the fulcrum element fitting into an opening of the glass support surface to attach the fulcrum element to the support surface.

5. The device of claim 1 further comprising support means attached to the first leg of the "U" shaped member to support the device on a surface.

6. The device of claim 1 wherein the "U" shaped member comprises a unitary element bent in the "U" shape, the curved portion of the "U" being resilient to allow the distal ends of the legs to be moved toward and away from each other.

7. The device of claim 1 further comprising indicia located on the pressure block coincident with the axis of the curved surface to allow the operator to locate the scoreline of the glass with respect to the pressure block.

* * * * *